March 30, 1937.  C. N. LIEB  2,075,734
VEHICLE BRAKE
Filed June 9, 1936  2 Sheets-Sheet 1
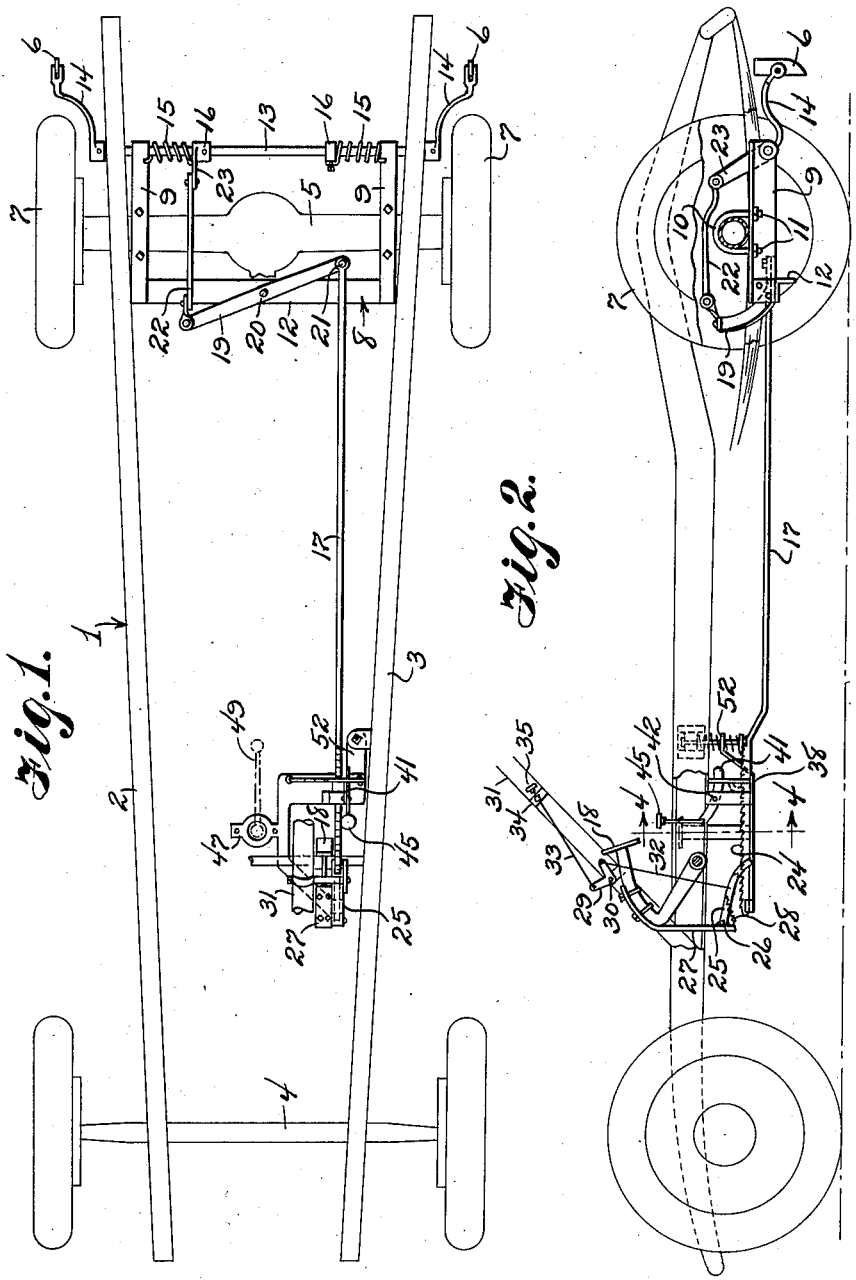
Christian N. Lieb
INVENTOR
BY Victor J. Evans & Co.
ATTORNEYS March 30, 1937.   C. N. LIEB   2,075,734
VEHICLE BRAKE
Filed June 9, 1936   2 Sheets-Sheet 2
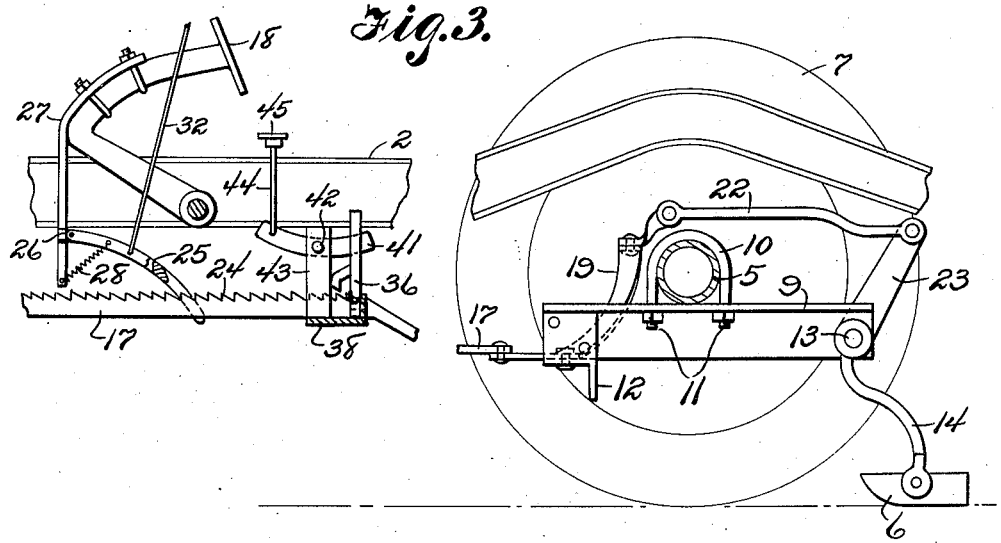
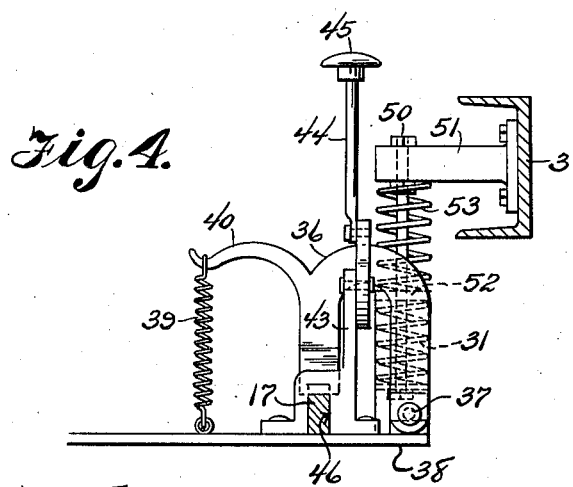
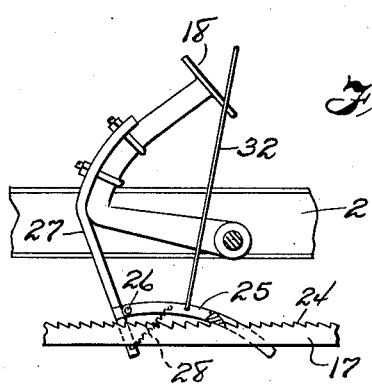
Christian N. Lieb
INVENTOR
BY Victor J. Evans & Co.
ATTORNEYS Patented Mar. 30, 1937

2,075,734

UNITED STATES PATENT OFFICE 2,075,734

VEHICLE BRAKE

Christian N. Lieb, Findlay, Ohio

Application June 9, 1936, Serial No. 84,362

5 Claims. (Cl. 188—5)

My invention relates to improvements in vehicle brakes for use particularly on automobiles and it is designed primarily to provide a simply constructed and efficient quick acting brake of the ground engaging type for use either as braking equipment supplementing the usual brakes of an automobile, or separately therefrom, to obviate skidding and providing emergency equipment for use in the event of failure of the usual braking mechanism of the machine.

Another object is to provide a brake for the purpose above set forth which may be readily incorporated with the standard equipment of automobiles without necessitating any change in such equipment thereof.

To the accomplishment of the above and subordinate objects, presently appearing, my invention comprises a pair of brake shoes tensioned for movement to engage the ground in the rear of the rear wheels of the automobile, means for operating the brake shoes to releasing or disengaging position by operation of the clutch pedal of the machine and settable to ineffective position to permit use of the clutch pedal in its normal capacity, and means for locking the brake shoes in disengaged tensioned position and operative by pressure exerted by the foot of the automobile driver to unlocking position to permit the shoe to be engaged with the ground by the tension exerted thereagainst.

In the accompanying drawings a preferred embodiment of my invention has been illustrated which has been described in detail and defined in the following description and claims, respectively.

In said drawings:

Figure 1 is a view in top plan of part of an automobile chassis and running gear, and illustrating my improved brake attached thereto, the parts being shown in brake releasing or ground disengaging position.

Figure 2 is a view in side elevation partly broken away and shown in section.

Figure 3 is a fragmentary view in side elevation, drawn to an enlarged scale, and illustrating the position of the parts in the ground engaging position of the shoes.

Figure 4 is a view in transverse section taken on the line 4—4 of Figure 2 looking in the direction indicated by the arrows and drawn to an enlarged scale, and Figure 5 is a detail, fragmentary view, in side elevation of the clutch pedal and parts of brake releasing means operated thereby.

Describing my invention in detail, with reference to the drawings by numeral, 1 designates the usual chassis frame of an automobile including the side frame bars 2 and 3, respectively, and 4 and 5 the usual front axle and rear axle housing, respectively.

According to my invention a pair of opposed brake shoes 6 are mounted at the rear of the chassis 1 for vertical swinging movement to ground engaging and disengaging positions, respectively, and to track directly behind the rear wheels 7. The mounting for the brake shoes 6 comprises a frame 8 of angle bar construction, including end bars 9 clipped to the rear axle housing 5 adjacent opposite ends of the same, as by the U-bolts 10 and nuts 11, and a front cross bar 12 connecting the end bars 9. A brake shaft 13 is journaled adjacent its opposite ends in the rear ends of the bars 9 to extend transversely of the chassis 1 and to swingingly support the brake shoes 6. The brake shoes 6 are mounted upon opposite ends of the shaft 13 for swinging movement thereby through the medium of brake arms 14 having their opposite ends fixedly connected in any suitable manner to said brake shoes and said shaft, respectively. A pair of brake setting springs 15, coiled around the shaft 13, are interposed between opposite bars 9 and collars 16 fast upon the shaft 13 and connected to said bars 9 and collars 16 so as to tension the shaft and shoes 6 for movement to engage the latter with the ground.

The brake shoes 6 are swung to ground disengaging position, in opposition to the tension exerted thereagainst, by brake releasing mechanism comprising a brake rod 17 mounted to reciprocate longitudinally of the chassis 1, operating connections between the rear end of the rod 17 and the shaft 13 and operating connections between the clutch pedal 18 of the machine and said rod. The operating connections between the rod 17 and the shaft 13 comprise a lever 19 pivotally mounted intermediate its ends, as at 20, on the front frame bar 12 and having one end connected to the rod 17, as at 21, and link connections 22 between its opposite end and a lever arm 23 on one of the collars 16. The operating connections between the clutch pedal 18 and the rod 17 comprise a ratchet toothed section 24 at the front end of the rod 17, and a pawl 25 pivotally mounted as at 26 upon an arm 27 depending from said pedal 18 for reciprocation by said pedal to move the rod 17 rearwardly and rock the shaft 13 counter-clockwise. The pawl 25 is normally held in engagement with the teeth 24 by means of a spring 28 suitably connected to said pawl and to the arm 27. The pawl 25 is adapted to be set to an ineffective position, against the tension of the spring 28, to permit the use of the clutch pedal 18 in its normal capacity. The setting means comprises a bell crank lever 29 pivotally mounted as at 30 upon the steering post 31 of the machine, a rod 32 operatively connecting one arm of the lever 29 with the pawl 25 and a pawl setting rod 33 connected to the other arm of the lever 29 and manually slidable in a fixed guide 34 by means of a button 35 on one end of the rod. The arrangement of the described setting parts is such that by pushing the rod 33 the pawl 25 may be disengaged from the teeth 24 and held in disengaged position by frictional engagement between the rod 33 and the guide 34.

Means are provided for locking the rod 17 against movement in the opposite direction during idle movement of the pawl 25, and in brake releasing position, against the urge of the springs 15. The locking means comprises an upstanding locking dog 36 of inverted U-shape one leg of which is pivoted as at 37 to a horizontally disposed frame 38, presently referred to in detail, the other leg of said dog engaging the teeth 24 of the rod 17. A spring 39 having its opposite ends suitably connected to a laterally extending arm 40 on the dog 36 and to the frame 38, respectively, urges the dog 36 into locking engagement with the teeth 24. The dog 36 is movable from locking engagement by means of a rocking lever 41 pivotally mounted intermediate its ends, as at 42, upon a standard 43, on said frame 38 with one end underlying the dog 36. The lever 41 is adapted to be rocked in a direction to disengage the dog 36 by means of a rod 44 suitably connected to the other end of said lever and having at its upper end a head 45 for engagement by the foot of the driver. The rod 44 is suitably guided, for instance in a floor board, not shown, of the machine. As shown in Figure 4, the standard 43 is bifurcated at its lower end as at 46 to form a guide for the toothed section of the rod 17.

As a convenient means of mounting the rod 17 for sliding movement under operation of the clutch pedal 18, and securing the locking means in proper position relative to the rod, without necessitating special castings on the chassis the frame 38, beforementioned, is provided for supporting said rod and locking means and said frame is secured to the engine casing, not shown, and to one side bar 3 of the chassis frame 1. Preferably the frame 38 has a laterally extending socket part 47 at one side designed to fit over the usual sleeve 48 on the transmission casing through which the gear shift lever 49 extends. On its other side the frame is yieldingly suspended from the chassis frame bar 3 by means of a vertically disposed rod 50 swingably mounted at its upper end in a bracket 51 extending inwardly from the chassis bar 3, a bracket arm 52 on said frame through which the rod 50 extends, and a pair of cushioning springs 53 on said rod and upon opposite sides of said arm 52, respectively. The described suspension mounting for the frame 38 provides for compensating movement of the parts supported by said frame in the event that the automobile is powered by an engine resiliently mounted as in the case of the so-called floating power type of engine mounting.

In the operation of my invention, assuming that the parts are in brake releasing position in which position the rod 17 is locked by the mechanism described, to set the brakes it is merely necessary for the driver to exert pressure against the rod 44. This operation moves the locking dog 36 to unlocking position whereupon the brake shoes 6 are immediately thrown against the ground as will be clear. In this connection it is to be understood that the springs 15 have sufficient reactive power to engage the shoes 6 with the ground to obtain the proper braking effect. To release the brake the pawl 25 may be moved into effective position in the manner previously described and the clutch pedal 18 operated with a pumping action to move the rod 17 into brake releasing position as will be clear. When the brakes have been reset to releasing position the pawl 25 may be moved to its ineffective position so that the clutch pedal 18 may be operated without effect upon the brake mechanism.

It is to be understood that the details described in the foregoing and shown in the accompanying drawings are illustrative of a preferred embodiment of my invention only, and that right is herein reserved to modifications of such details falling within the scope of the claims appended hereto.

What I claim is:

1. In a braking mechanism for use with an automobile having a clutch pedal, a pair of ground engaging brake shoes swingably mounted at the rear of the automobile for movement to ground engaging and disengaging positions, respectively, and tensioned for movement to engaging position, releasable locking means for holding said shoes against such engaging movement, and brake disengaging means operative by the clutch pedal of the automobile.

2. In a brake mechanism for use with an automobile having a clutch pedal, a pair of ground engaging brake shoes swingably mounted at the rear of the automobile for movement to ground engaging and disengaging positions, respectively, and tensioned for movement to engaging position, brake releasing means including a reciprocating ratchet rod operatively connected to said shoes and urged in one direction by the tension exerted on said shoes, a pawl mechanism operative by said clutch pedal to move the rod in the opposite direction, and locking means for holding said rod against movement under the tension exerted thereagainst and including a dog movable into and out of cooperative relation to said ratchet rod.

3. In a brake mechanism for use with an automobile having a clutch pedal, a pair of ground engaging brake shoes swingably mounted at the rear of the automobile for movement to ground engaging and disengaging positions, respectively, and tensioned for movement to engaging position, brake releasing means including a reciprocating ratchet rod operatively connected to said shoes and urged in one direction by the tension exerted against said shoe, a reciprocating pawl operative by the clutch pedal against said rod to move the latter in the opposite direction and having an idle stroke, a dog for locking the rod against movement under the tension exerted thereagainst and movable to an unlocking position by the foot of the automobile operator.

4. In a brake mechanism for use with an automobile having a clutch pedal, a pair of ground engaging brake shoes swingably mounted at the rear of the automobile for movement to ground engaging and disengaging positions, respectively, and tensioned for movement to engaging position, brake releasing means including a reciprocating ratchet rod operatively connected to said shoes and urged in one direction by the tension exerted against said shoes, a reciprocating pawl operative by said clutch pedal against said ratchet rod to move the latter in the opposite direction and settable to effective and ineffective positions, respectively, manually manipulative means for setting said pawl, and means for locking said rod against movement under the tension exerted thereagainst and in the ineffective position of said pawl and including, a dog normally engaging said ratchet rod and operative to disengaging position by the foot of the automobile operator.

5. In a brake mechanism for an automobile having a clutch pedal, ground engaging brake shoes operative to ground engaging and disengaging positions, respectively, brake operating means including a reciprocating rod, means for operating said rod in one direction by operation of said clutch pedal, locking means for holding said rod against movement in the opposite direction and operative to unlocking position by the foot of an automobile operator, and a mounting for said rod and locking means comprising a frame pivotally mounted on the engine casing of the automobile, and yieldingly and pivotally suspended from the chassis frame of the automobile.

CHRISTIAN N. LIEB.